(No Model.)
J. BARRY.
CLINICAL THERMOMETER.
No. 268,853. Patented Dec. 12, 1882.
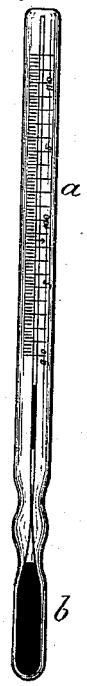
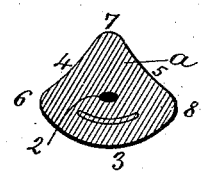

UNITED STATES PATENT OFFICE.

JOHN BARRY, OF NEW YORK, N. Y.

CLINICAL THERMOMETER.

SPECIFICATION forming part of Letters Patent No. 268,853, dated December 12, 1882.

Application filed October 9, 1882. (No model.)

*To all whom it may concern:*

Be it known that I, JOHN BARRY, of the city and State of New York, have invented an Improvement in Medical Thermometers, of which the following is a specification.

Medical thermometers are usually made with a mercurial index within the tube, the same being moved by the mercury column as it expands, there being a small quantity of air between the mercury column and the index. In the manufacture of these thermometers a round glass tube has been used, the bore of the tube being central, or nearly so, and the index being magnified by the refraction of the glass. These mercury-thermometers are liable to roll, when laid on a table, and to be broken. Other thermometers have been made with the hole out of center to increase the magnifying action, and still others have been prismatic, so as to prevent them rolling. Many of these thermometers are more or less angular on the edges, and they are hence liable to injure the person when passed into the passages of the body, and they are difficult to keep clean.

My thermometer is made for avoiding all the difficulties heretofore experienced, and for giving to the thermometer the advantageous features hereinafter set forth.

In the drawings, Figure 1 represents the thermometer, and Fig. 2 is a cross-section in larger size of the tube.

The tube *a* is made with a mercury-bulb, *b*, at one end, as usual, but the tube itself is of the peculiar shape shown in Fig. 2—that is to say, the bore or mercury-tube 2 is in the center of the glass, or nearly so, and the back 3 of the glass is rounding, the sides 4 and 5 are slightly concave, and the edges 6 7 8 are rounded, as shown.

The first object is to make the glass sufficiently flattened to prevent the thermometer rolling. The second object is to get the back rounding, so that the instrument may not be angular, but, on the contrary, as rounding as possible. The third object is to obtain a rounded and nearly semicircular surface, 7, for the engraved divisions. This surface is at the highest part of the thermometer when laid on its back. Hence the index will be observed through the same in its magnified condition; and the divisions into degrees being upon this rounded portion 7, the index can be accurately observed either directly in front or slightly toward the sides, and the concave portions 4 and 5 receive the longer divisions and the numbers or figures; and these being in close proximity to the index as observed through the glass, there will be no risk of inaccuracy of reading, and the figures being in the slightly-recessed portions 4 and 5, are not liable to become injured in handling. Besides this, my thermometer is not as liable to break as some of those heretofore constructed, because the rounded back allows for the use of a greater quantity of glass, and as a consequence the strength is increased.

These features of the thermometer render the same more useful than those heretofore made, and the curves at the neck of the bulb, being very gradual, as shown in Fig. 1, are easily kept clean.

I claim as my invention—

The medical thermometer having a rounded back, 3, with rounded edges 6 8, slightly-concave sides 4 and 5, a rounded edge, 7, between the concave sides, with the divisions upon the same, and the figures in the concave sides 4 and 5, as and for the purposes set forth.

Signed by me this 6th day of September, A. D. 1882.

JOHN BARRY.

Witnesses:
GEO. T. PINCKNEY,
CHAS. H. SMITH.